Nov. 11, 1958  G. TAUNTON  2,859,796
MEANS FOR SEALING MATERIALS BY HEAT
Filed June 23, 1954  4 Sheets-Sheet 1
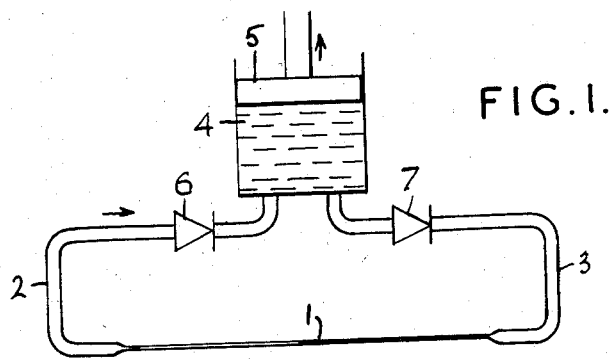
FIG.1.
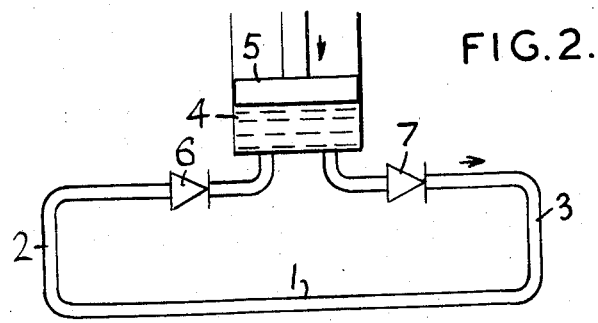
FIG.2.
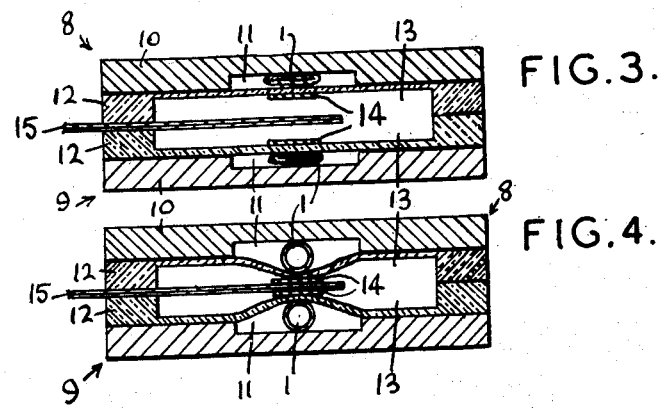
FIG.3.
FIG.4.
INVENTOR:
GERALD TAUNTON
BY:

Nov. 11, 1958 — G. TAUNTON — 2,859,796
MEANS FOR SEALING MATERIALS BY HEAT
Filed June 23, 1954 — 4 Sheets-Sheet 3

INVENTOR:
GERALD TAUNTON
BY:

2,859,796

MEANS FOR SEALING MATERIALS BY HEAT

Gerald Taunton, Wells, Somerset, England, assignor to Wilts United Dairies Limited, Trowbridge, England, a British company Application June 23, 1954, Serial No. 438,819

Claims priority, application Great Britain June 30, 1953

19 Claims. (Cl. 154—42)

This invention relates to sealing means for causing a material, such as suitably coated paper or other sheet material, including thermoplastic and laminated sheet material, to adhere to a similar or different material by the application of heat.

It relates in particular to means for heat sealing such materials together for the formation of pouches or packages containing commodities, and especially vacuum packages.

The invention is applicable to heat sealing devices, known as "impulse" sealers, which are heated momentarily in order to heat the material to be sealed and are then allowed to cool again before the sealed material is removed from the device. It is necessary to use this kind of sealing device for example when the material to be sealed tends to adhere to the hot parts of the device and the heated material must be allowed to cool while still in contact therewith.

This invention has for its object to provide improved means for sealing materials by heat.

According to this invention apparatus for heat sealing a material comprises a heating element, an expansible member adjacent the heating element and means for expanding the expansible member to press the heating element againt the material. The apparatus preferably comprises two heating elements between which the material is introduced, an expansible member adjacent each heating element on the side thereof opposite to the material, and means for expanding both expansible members to press the two heating elements against the material. The preferred apparatus for heat sealing a material according to this invention comprises two jaws for the reception therebetween of the material, a heating element in at least one of the jaws, an expansible member adjacent each heating element, and means for expanding each expansible member to press the heating element against the material.

Each of the jaws may include a rigid portion and the expansible member may be located between said rigid portion and the heating element, and means may be provided for preventing said rigid portions from moving apart during expansion of the expansible members. One or both jaws may be provided with rigid stops to limit the closing movement of the jaws.

The expansible member may consist of a flexible tube, preferably a thin-walled tube which is normally in a flattened condition and which is expanded by the application of internal fluid pressure, preferably by forcing a liquid, such as cold water, into the tube. When the fluid pressure is released, the flexible tube collapses again to its flattened condition. The flexible tube is preferably made of a material which is capable of withstanding the temperatures involved in heat sealing but which does not unduly obstruct the passage of heat therethrough; a suitable material is silicone rubber. Alternatively, a strip of such material may be interposed between the heating element and the flexible tube to protect the latter from injury by undue heat. Each heating element may consist of a thin flexible tape or wire of electrical resistance material, preferably a metal, such as an alloy of nickel and chromium. Each heating element is located in the face of the jaw so that it can be brought into contact with the material between the jaws.

The flexible tube may be located within a groove in the rigid portion of the jaw and connected by means of relatively inextensible pipes, such as metal or thick-walled rubber pipes, to a receptacle containing liquid and provided with a flexible diaphragm such that when pressure is applied to the diaphragm liquid is forced from the receptacle into the flexible tube to expand the same and press the heating element onto the material between the jaws. It is preferred to ensure unidirectional circulation of the liquid in the tube by providing non-return valves in the connecting pipes. The diaphragm may be actuated mechanically, pneumatically or hydraulically.

A heat sealing device according to this invention may be operated as follows:

The material to be sealed is inserted between the two jaws and between the two heating elements, the jaws then being closed. When the jaws are of the kind described in my application No. 339,017, filed February 26, 1953, now U. S. Patent No. 2,778,171, and the material between the jaws is the open end of a pouch, vacuum may then be applied to remove air from the pouch. The diaphragm is then operated to expand the flexible tubes which in turn press the heating elements onto the material to be sealed, which latter is firmly gripped between the two heating elements.

Electric current is then passed through the heating elements and the material is thus sealed together under the action of heat and pressure. After a suitable time interval, the length of which depends on the material being sealed, the passage of current is interrupted while the flexible tubes remain in expanded condition. Heat from the heating elements is conducted to the liquid in the flexible tubes and, upon release of pressure on the diaphragm, this liquid flows back into the receptacle, thus withdrawing the absorbed heat from the jaws.

If necessary, the receptacle may be provided with special cooling means so that the liquid therein is kept cold, but provided the receptacle is of adequate size and adequate radiation is possible, there is no need for such special cooling means.

The heating elements are preferably kept in tension, for example by the provision of a spring adjacent one or both ends of the same, in order to keep the elements in correct position and to absorb expansion.

The period during which the current is passed through the heating elements and the period during which liquid is supplied to the flexible tube are preferably controlled in timed relationship in known manner according to the material to be sealed.

The heat sealing means according to this invention may be employed with advantage in the method and apparatus described and claimed in my above mentioned application No. 339,017.

The invention will now be further described with reference to the accompanying drawings in which:

Figures 1 and 2 are purely diagrammatic illustrations of the manner in which an expansible member according to this invention can be expended;

Figures 3 and 4 are diagrammatic sectional views of jaws of a heat sealing apparatus according to this invention.

Figure 5:
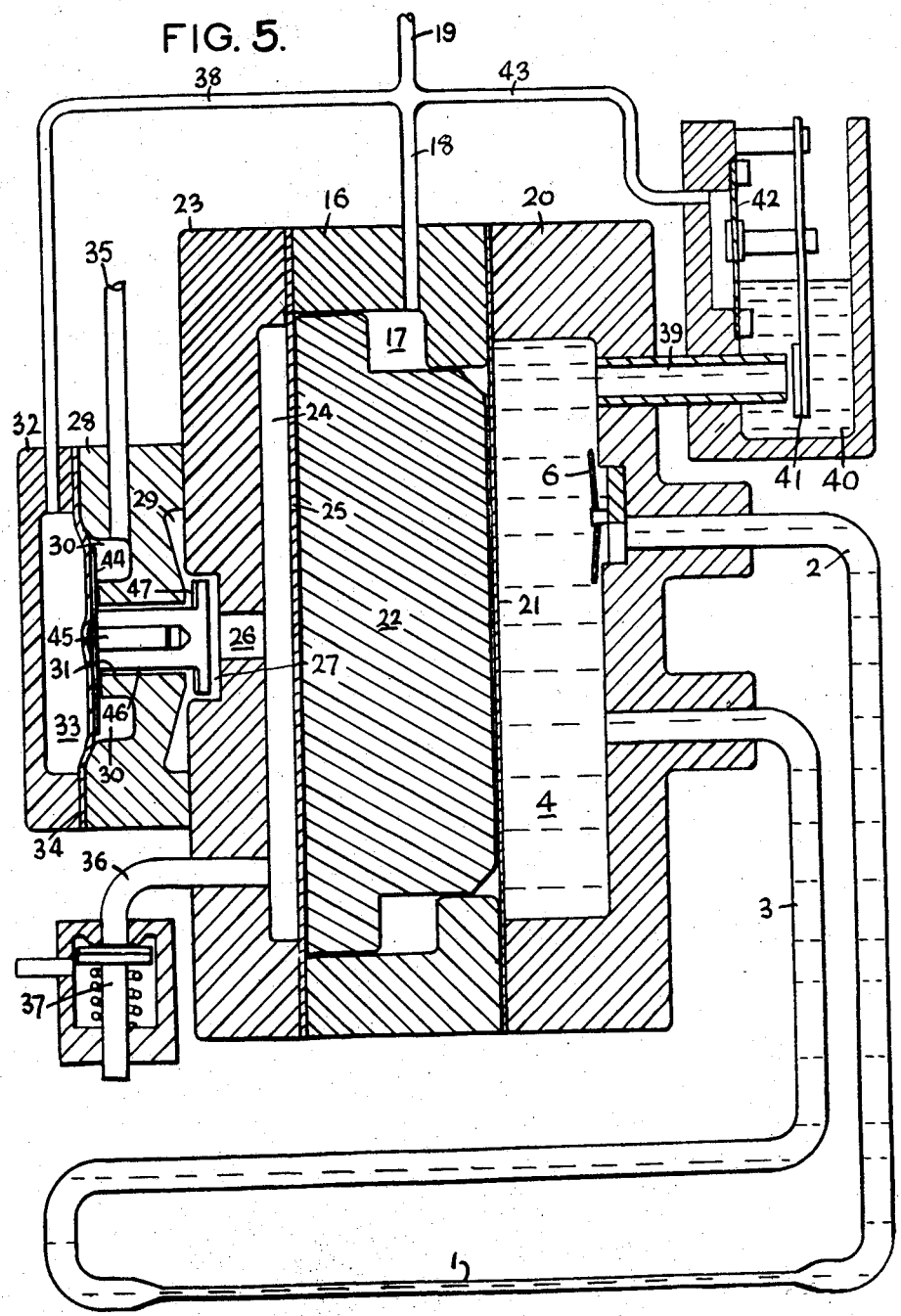
Figures 5 to 7 are sectional views of apparatus for expanding an expansible member, showing the apparatus in three separate stages of operation.

Referring first to Figures 1 and 2, a flexible tube 1 (for example a thin-walled rubber tube) is connected by two substantially inexpansible tubes 2 and 3 (for example thick-walled rubber tines or metal tubes) to a receptacle 4 for fluid, such as water. Pressure can be applied to the fluid in the receptacle 4 by means of a piston 5, or by means of a diaphragm, or otherwise. Figure 2 shows the operative position in which pressure is applied to the piston 5 to cause fluid to flow from the receptacle 4 into the flexible tube 1 to expand the same. Figure 1 shows the inoperative position in which pressure is released from the piston 5 and the fluid in the flexible tube 1 returns to the receptacle 4 leaving the tube 1 flattened. Unidirectional flow of the fluid may be ensured by the provision of two non-return valves 6 and 7. When pressure is applied to the piston 5, as in Figure 2, valve 7 is open while valve 6 remains closed, thus enabling fluid to pass from the receptacle 4 through the tube 3 to the tube 1. When the piston is moved in the opposite direction, as in Figure 1, valve 7 is closed and valve 6 is opened and the fluid flows from tube 1 through tube 2 back to the receptacle 4.

Referring now to Figures 3 and 4, two coacting jaws 8 and 9 each comprise a portion 10 of rigid material having a recess 11 and a portion 12 of heat-resistant resilient material having a recess 13. The recess 13 is provided for the purpose of evacuating a pouch of which the end is inserted between the jaws 8 and 9 and may be omitted when it is merely desired to seal material without evacuation.

A flexible tube 1 of the kind described with reference to Figures 1 and 2 is located within the recess 11 and thus lies between the rigid portion 10 and the resilient material 12. Figure 3 corresponds to the arrangement of Figure 1 and Figure 4 corresponds to Figure 2. A heating element 14 is provided in each jaw and lies in contact with the resilient material 12 within the recess 13. Reference numeral 15 indicates two plies of heat-sealable material, as for example the unsealed end of a pouch, which it is desired to seal together by heat. The jaws 8 and 9 may be of the kind described in our application No. 339,017 so that air may be withdrawn from the pouch by applying a vacuum to the recesses 13 in the closed jaws. Heat sealing of the plies 15 is effected by expanding the flexible tube 1, as shown in Figure 4, so that the heating elements 14 are brought into contact with the plies 15, whereupon an electric current is passed through the elements 14 to heat the same and seal the plies together.

It will be understood that the thin wall portions shown in curved condition in Fig. 4, and consisting of the resilient material 12 are supported on support means which include the jaws 8 and 9, and the other parts of the resilient material 12 for movement toward and away from the work piece 15. These wall portions, on which the heating elements 14 lie, constitute together with the heating elements 14, heating means which are mounted on the support means for movement relative thereto toward and away from the work piece supported on the support means, which, as pointed out above, include the rigid portions 10, and the parts of the resilient material 12 which are not deformed when the flexible tubes 1 are expanded.

Where two flexibles tubes 1 are provided, one in each jaw, as shown in Figures 3 and 4, each tube may be connected to its own receptacle 4, but usually it is more convenient to connect both flexible tubes to the same receptacle 4.

Figure 6:
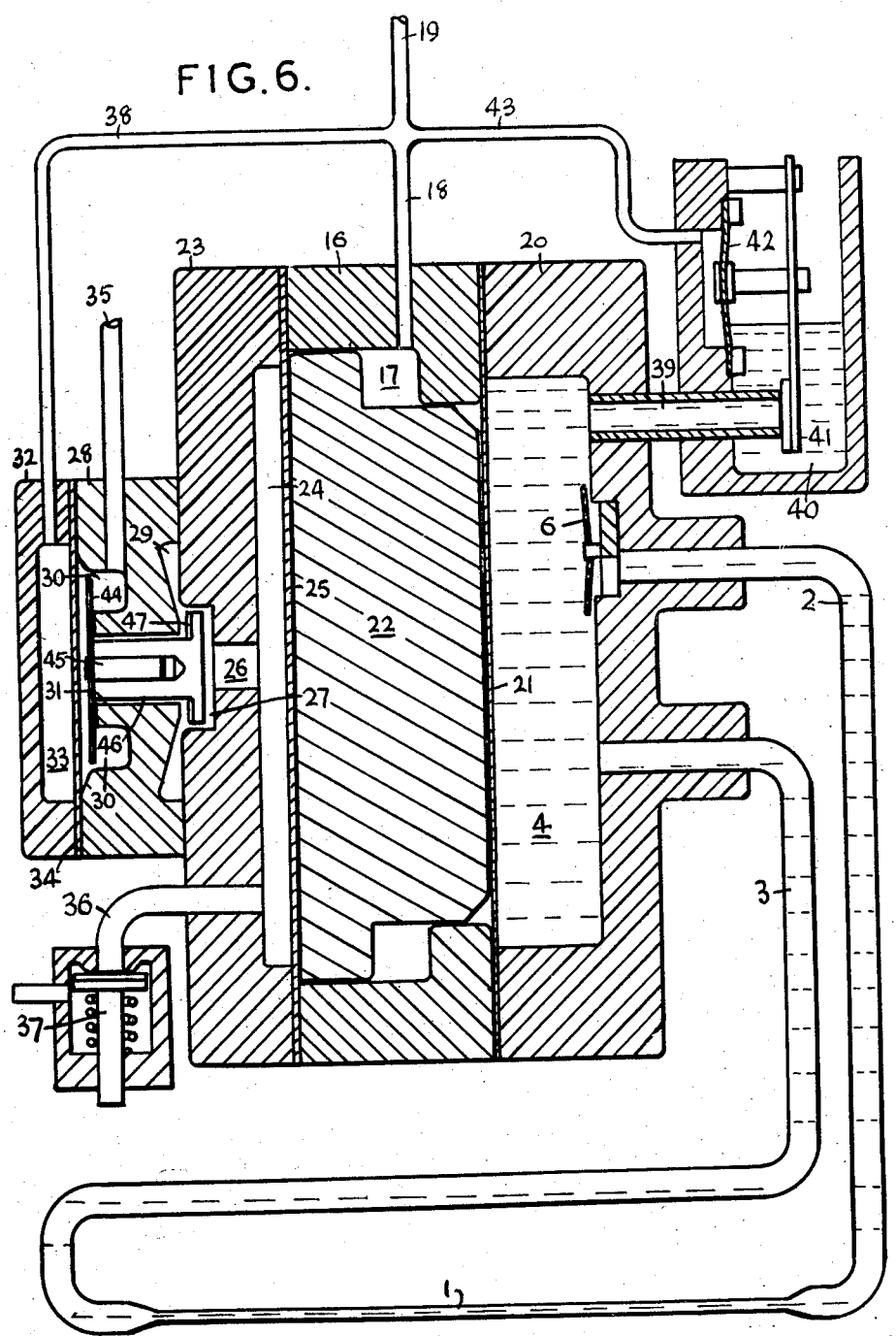
Figure 7:
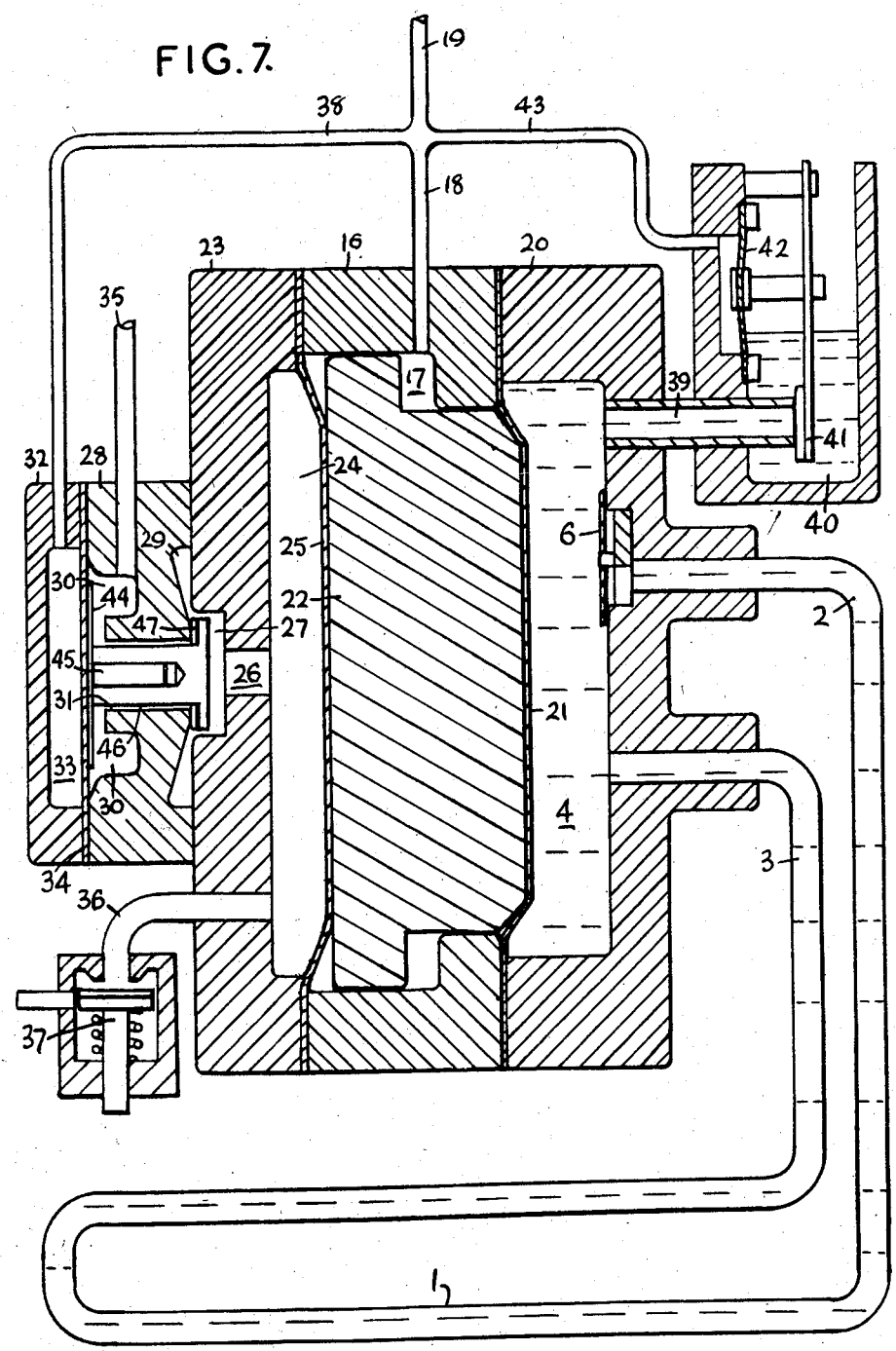

Referring now to Figures 5, 6 and 7, the apparatus therein illustrated comprises an annular block 16 of which the hollow central portion 17 communicates by a pipe 18 with a pipe 19 which is capable of being connected to a source of vacuum or vented to the atmosphere; a block 20 having a recess 4 for the reception of the fluid, such as water, said recess being separated from the hollow portion 17 by a diaphragm 21 against which rests a piston 22 within the hollow portion 17; another block 23 having a recess 24 separated from the hollow portion 17 by a diaphragm 25 against which rests the opposite face of the said piston 22, and also having a central bore 26 connecting said recess 24 to another recess 27 in the opposite face of the block 23; another block 28 having a recess 29 in one face and a recess 30 in the other face, the two recesses being connected together by a central bore 31; and a block 32 having a recess 33 therein separated from the recess 30 by a diaphragm 34. The recess 30 is connected to a source of vacuum by means of a pipe 35. The recess 24 is capable of being vented to atmosphere through a pipe 36 which is normally closed by means of a spring urged valve 37. The recess 33 is connected by a pipe 38 to the pipe 19. The recess 4 is connected by means of substantially inexpansible tubes 2 and 3 to a flexible tube 1 constituting an expansible member. The outlet from the recess 4 to the tube 2 is provided with a non-return valve 6. The recess 4 also communicates by means of a pipe 39 with a receptacle 40 containing the same fluid as the recess 4. The pipe 39 is capable of being closed by a valve 41 which is actuated by a diaphragm 42 which in turn is actuated by the application of a vacuum through a pipe 43 connected to the pipe 19. The pipe 39 is arranged at substantially the highest point of the recess 4 so that any air which may have become disengaged from the fluid in said recess 4 may escape through the pipe 39 and out through the receptacle 40 when the valve 41 is in open position as shown in Figure 5; the open position of the valve 41, which coincides with the "idle" position of the apparatus, also permits expansion or contraction of the fluid owing to changes in atmospheric temperature.

The recess 30 contains a plate 44 secured to a pin 45, the latter projecting into the open end of a sleeve 46 the other, closed end of which is flanged and forms a valve 47 capable of sealing off the recesses 27 and 29 from the central bore 31 when in the position shown in Figure 7.

While only one flexible tube 1 has been shown, it will be understood that it is preferred to provide two such tubes, the second tube being connected to the pipes 2 and 3 in parallel with the tube 1 shown. Each of the tubes 1 may be mounted within a jaw of a sealing apparatus, for example a jaw of the kind shown in Figures 3 and 4, between which the material to be heat sealed is placed.

The operation of the apparatus will now be described.

Figure 5 shows the positions of the parts before the apparatus is put to use, i. e. the idle position.

Figure 6 shows the position of the parts which is initiated by the closing of the jaws.

Figure 7 shows the position of the parts during the actual expansion of the expansible member.

In the idle position shown in Figure 5, the pipe 35 is connected to a source of vacuum, the pipe 19 is vented to atmosphere and the valve 37 is closed. Atmospheric pressure therefore prevails in pipes 38, 18 and 43. Pipe 38 connects with recess 33 so that diaphragm 34 is forced to the right (as viewed in the drawing) since a vacuum exists in the recess 30 and extends through the central bore 31 to the recesses 29, 27 and 24 and the pipe 36. Pipe 18 communicates with the recess 17; atmospheric pressure thus acts on the diaphragm 25 while the recess 24 is under vacuum, the diaphragm 25 thus being pressed towards the left (as viewed in the drawing). The pipe 43 communicates with the chamber associated with the diaphragm 42 and the valve 41 is held in open position by spring action. The flexible tube 1 is in flattened condition.

The operation of closing the jaws of the sealing apparatus is caused to actuate a valve (not shown) to connect pipe 19 to a vacuum source. This results in the positions of the parts shown in Figure 6. The vacuum in the pipe 43 causes the diaphragm 42 to move to the left and close the valve 41. The vacuum in the pipe 38 and recess 33 restores the diaphragm 34 to its normal position as shown. The recess 17 is evacuated through the pipe 18.

In order to effect expansion of the flexible tube 1, the valve 37 is vented to atmosphere (Figure 7) this may be done manually, or it may be effected electrically or mechanically in timed relationship with the closing of the jaws by known methods. Air then passes in through the pipe 36 into the recesses 24, 27 and 29. The pressure in the recesses 27 and 29 forces the valve 47 onto its seating, and the pressure in the recess 24 forces the diaphragm 25 and the piston 22 to the right (as viewed in the drawing). The piston 22 in turn forces the diaphragm 21 to the right, causing the fluid in the recess 4 to close the valve 6 and flow through the tube 3 to expand the flexible tube 1. Heat sealing may then be effected by conventional methods. The valve 37 is then closed, either manually, or electrically or mechanically in timed relationship. As the jaws open, the pipe 19 is vented to atmosphere. Air pressure in the pipe 43 acts on the diaphragm 42 to open the valve 41. Air pressure in the pipe 38 acts on the diaphragm 34 to move the valve 47 off its seating and establish communication between recess 30 and recess 24, which thereupon becomes evacuated. Air pressure in the pipe 18 then moves the piston 22 to the left to restore the apparatus to the idle position of Figure 5. It is found that the single non-return valve encourages unidirectional flow, but if desired this may be ensured by interposing a further non-return valve, acting in the opposite direction, in the pipe 3.

What is claimed is:

1. A heat sealing apparatus comprising, in combination, support means for supporting a work piece to be heat sealed; heating means mounted on said support means for movement relative thereto toward and away from a work piece supported thereby; and moving means for moving said heating means relative to said support means, said moving means including an inflatable member capable of assuming an inflated and a deflated position and connected to said heating means so as to move the same toward and away from the work piece when said member is inflated and deflated, respectively.

2. A heat sealing apparatus comprising, in combination, support means for supporting a work piece to be heat sealed; heating means mounted on said support means for movement relative thereto toward and away from a work piece supported thereby; and moving means for moving said heating means relative to said support means, said moving means including an inflatable member capable of assuming an inflated and a deflated position and connected to said heating means so as to move the same toward the work piece when said member is inflated.

3. A heat sealing apparatus comprising, in combination, support means for supporting a work piece to be heat sealed; heating means mounted on said support means for movement relative thereto toward and away from a work piece supported thereby; and moving means for moving said heating means relative to said support means, said moving means including an inflatable member capable of assuming an inflated and a deflated position and connected to said heating means so as to move the same toward and away from the work piece when said member is inflated and deflated, and inflating and deflating means for inflating and deflating said member.

4. A heat sealing apparatus comprising, in combination, support means having an engaging portion and adapted to support a work piece to be heat sealed at a work zone spaced from said engaging portion; heating means mounted on said support means between said work zone and said engaging portion for movement relative to said support means toward and away from a work piece supported by said support means at said work zone; and moving means for moving said heating means relative to said support means, said moving means including an inflatable member capable of assuming an inflated and a deflated position, said member being arranged between said heating means and said engaging portion and adapted to engage said heating means and to abut against said engaging portion so as to move said heating means toward the work piece when said member is inflated.

5. A heat sealing apparatus comprising, in combination, support means for supporting a work piece to be heat sealed; heating means mounted on said support means for movement relative thereto toward and away from a work piece supported thereby; and moving means for moving said heating means relative to said support means, said moving means including a normally substantially flat inflatable member capable of being inflated and assuming a substantially tubular configuration and connected to said heating means so as to move the same toward the work piece when said member is inflated and assumes its substantially tubular configuration.

6. A heat sealing apparatus comprising, in combination, support means for supporting a work piece to be heat sealed; heating means mounted on said support means for movement relative thereto toward and away from a work piece supported thereby; and moving means for moving said heating means relative to said support means, said moving means including a normally substantially flat inflatable member capable of being inflated and assuming a substantially tubular configuration and connected to said heating means so as to move the same toward the work piece when said member is inflated and assumes its substantially tubular configuration, and inflating means for uni-directionally introducing fluid into said member so as to inflate the same and move said heating means toward the work piece.

7. In a heat sealing apparatus, in combination, support means for supporting a work piece to be heat sealed; two heating means mounted on said support means for movement relative thereto toward and away from opposite sides, respectively, of a work piece supported by said support means; and two moving means for moving said heating means, respectively, relative to said support means, each of said moving means including an inflatable member capable of assuming an inflated and a deflated position and connected to one of said heating means, respectively, so as to move the same toward and away from the respective side of the work piece when said member is inflated and deflated.

8. In a heat sealing apparatus, in combination, support means for supporting a work piece to be heat sealed; two heating means mounted on said support means for movement relative thereto toward and away from opposite sides, respectively, of a work piece supported by said support means; two moving means for moving said heating means, respectively, relative to said support means, each of said moving means including an inflatable member capable of assuming an inflated and a deflated position and connected to one of said heating means, respectively, so as to move the same toward the respective side of the work piece when said member is inflated; and inflating means for simultaneously inflating said inflatable and deflatable members of said moving means.

9. A heat sealing apparatus comprising, in combination, support means having opposite engaging portions and adapted to support a work piece to be heat sealed at a work zone intermediate said engaging portions; two heating means mounted on said support means between said work zone and said engaging portions, respectively, for movement relative to said support means toward and away from opposite sides of a work piece supported by said support means at said work zone; and two moving means for moving said heating means, respectively, relative to said support means, each of said moving means including a normally substantially flat inflatable member capable of being inflated and assuming a substantially tubular configuration and arranged between one of said heating means and the corresponding engaging portion, respectively, and adapted to engage said respective heating means and to abut against said corresponding engaging portion so as to move said respective heating means toward the corresponding side of the work piece when said member is inflated.

10. A heat sealing apparatus comprising, in combination, support means having opposite engaging portions and adapted to support a work piece to be heat sealed at a work zone intermediate said engaging portions; two heating means mounted on said support means between said work zone and said engaging portions, respectively, for movement relative to said support means toward and away from opposite sides of a work piece supported by said support means at said work zone; two moving means for moving said heating means, respectively, relative to said support means, each of said moving means including a normally substantially flat inflatable member capable of being inflated and assuming a substantially tubular configuration and arranged between one of said heating means and the corresponding engaging portion, respectively, and adapted to engage said respective heating means and to abut against said corresponding engaging portion so as to move said respective heating means toward the corresponding side of the work piece when said member is inflated; and inflating means for simultaneously inflating said members of said moving means whereby both of said heating means may simultaneously be moved toward and engage the work piece.

11. A heat sealing apparatus comprising, in combination, support means for supporting a work piece to be heat sealed; flexible heating means mounted on said support means for movement relative thereto toward and away from a work piece supported thereby; and moving means for moving said heating means relative to said support means, said moving means including a flexible inflatable member capable of assuming an inflated and a deflated position and connected to said heating means in such a manner that when said member is inflated, said heating means is moved toward the work piece and, as a result of the flexibility of said heating means and of said member, into intimate engagement with the work piece irrespective of the shape thereof.

12. A heat sealing apparatus comprising, in combination, support means for supporting a work piece to be heat sealed; at least two flexible heating means mounted on said support means for movement relative thereto toward and away from opposite sides, respectively, of a work piece supported by said support means; and at least two moving means for moving said heating means, respectively, relative to said support means, each of said moving means including a flexible inflatable member capable of assuming an inflated and a deflated position and connected to one of said heating means, respectively, in such a manner that when said member is inflated, the corresponding heating means is moved toward the work piece and, as a result of the flexibility of said corresponding heating means and said member, into intimate engagement with the corresponding side of the work piece irrespective of the shape of the corresponding side thereof.

13. A heat sealing apparatus comprising, in combination, support means for supporting a work piece to be heat sealed at a work zone; heating means mounted on said support means for movement relative thereto toward and away from said work zone; and combined moving and cooling means for moving said heating means relative to said support means and also for cooling said heating means, said combined moving and cooling means including an inflatable member capable of assuming an inflated position and a deflated position and also capable of being traversed by a coolant, said member being connected to said heating means in such a manner as to move the same toward said work zone when said member is inflated and also in such a manner as to cool said heating means when said member is traversed by the coolant.

14. A heat sealing apparatus comprising, in combination, support means for supporting a work piece to be heat sealed at a work zone; heating means mounted on said support means for movement relative thereto toward and away from said work zone; and combined moving and cooling means for moving said heating means relative to said support means and also for cooling said heating means and the work piece, said combined moving and cooling means including an inflatable member capable of assuming an inflated position when it is filled with a fluid medium and a deflated position when the fluid medium is removed, said member being connected to said heating means in such a manner as to move the same toward said work zone and into engagement with the work piece when said member is inflated as a result of its being filled with the fluid medium and also in such a manner that heat emitted by said heating means is absorbed by the fluid medium in the inflated member, which absorbed heat is carried away by the fluid medium when the same is removed from said member upon deflation thereof, thereby cooling said heating means and the work piece.

15. A heat sealing apparatus comprising, in combination, support means for supporting a work piece to be heat sealed at a work zone; flexible heating means mounted on said support means for movement relative thereto toward and away from said work zone; and combined moving and cooling means for moving said heating means relative to said support means and also for cooling said heating means and the work piece, said combined moving and cooling means including a flexible inflatable member capable of assuming a inflated position when it is filled with a fluid medium and a deflated position when the fluid medium is removed, said member being connected to said heating means in such a manner as to move the same toward said work zone and, as a result of the flexibility of said heating means and said member, into intimate engagement with the work piece irrespective of the shape thereof when said member is inflated as a result of its being filled with the fluid medium and also in such a manner that heat emitted by said heating means is absorbed by the fluid medium in the inflated member, which absorbed heat is carried away by the fluid medium when the same is removed from said member upon deflation thereof, thereby cooling said heating means and the work piece.

16. The combination defined in claim 15 wherein said inflatable member, in its inflated position, has a substantially tubular configuration.

17. In a heat sealing apparatus, in combination, support means for supporting a work piece to be heat sealed at a work zone; two heating means mounted on said support means for movement relative thereto toward and away from opposite sides, respectively, of a work piece supported at said work zone; and two combined moving and cooling means for moving said heating means, respectively, relative to said support means and also for cooling the respective heating means and that respective side of the work piece heated thereby, each of said combined moving and cooling means including an inflatable member capable of assuming an inflated position when it is filled with a fluid medium and a deflated position when the fluid medium is removed, each of said members being connected to its respective heating means in such a manner as to move the same toward said work zone and into engagement with the respective side of the work piece when said member is filled with the fluid medium and also in such a manner that heat emitted by said respective heating means is absorbed by the fluid medium in the inflated member, which absorbed heat is carried away by the fluid medium when the same is removed from said member upon deflation thereof, thereby cooling said respective heating means and said respective side of the work piece.

18. In a heat sealing apparatus, in combination, support means for supporting a work piece to be heat sealed at a work zone; two flexible heating means mounted on said support means for movement relative thereto toward and away from opposite sides, respectively of a work piece supported at said work zone; and two combined moving and cooling means for moving said heating means, respectively, relative to said support means and also for cooling the respective heating means and that respective side of the work piece heated thereby, each of said combined moving and cooling means including a flexible inflatable member capable of assuming an inflated position when it is filled with a fluid medium and a deflated position when the fluid medium is removed, each of said members being connected to its respective heating means in such a manner as to move the same toward said work zone and, as a result of the flexibility of said member and said respective heating means, into intimate engagement with the respective side of the work piece irrespective of the shape of said respective side when said member is filled with the fluid medium and also in such a manner that heat emitted by said respective heating means is absorbed by the fluid medium in the inflated member, which absorbed heat is carried away by the fluid medium when the same is removed from said member upon deflation thereof, thereby cooling said respective heating means and said respective side of the work piece.

19. The combination defined in claim 18 wherein each of said inflatable members, in its inflated position, has a substantially tubular configuration.

References Cited in the file of this patent

UNITED STATES PATENTS

| | | |
|---|---|---|
| 2,363,779 | Duffy et al. | Nov. 28, 1944 |
| 2,460,460 | Langer | Feb. 1, 1949 |
| 2,466,735 | Piazze | Apr. 12, 1949 |
| 2,646,105 | Langer | July 21, 1953 |